United States Patent
Watanabe

(10) Patent No.: US 8,076,044 B2
(45) Date of Patent: Dec. 13, 2011

(54) FUEL CELL ASSEMBLY AND INSPECTION DEVICE

(75) Inventor: Kazuhiro Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 573 days.

(21) Appl. No.: 12/373,343

(22) PCT Filed: Aug. 8, 2007

(86) PCT No.: PCT/JP2007/065886
§ 371 (c)(1),
(2), (4) Date: Jan. 12, 2009

(87) PCT Pub. No.: WO2008/026450
PCT Pub. Date: Mar. 6, 2008

(65) Prior Publication Data
US 2009/0246595 A1    Oct. 1, 2009

(30) Foreign Application Priority Data

Aug. 28, 2006 (JP) ................. 2006 230252
Jul. 31, 2007 (JP) ................. 2007 198357

(51) Int. Cl.
*H01M 8/04* (2006.01)
(52) U.S. Cl. ........................................ 429/514; 429/434
(58) Field of Classification Search .............. 429/434, 429/514, 437, 439, 471, 90
See application file for complete search history.

(56) References Cited

U.S. PATENT DOCUMENTS 6,294,280 B1 * 9/2001 Tanaka et al. ................. 429/434
6,653,008 B1 * 11/2003 Hirakata et al. .............. 429/434

FOREIGN PATENT DOCUMENTS

| JP | 2000-164236 A | 6/2000 |
|---|---|---|
| JP | 2001-23665 A | 1/2001 |
| JP | 2002-216834 A | 8/2002 |
| JP | 2002-367664 A | 12/2002 |
| JP | 2003-234119 A | 8/2003 |
| JP | 2004-288618 A | 10/2004 |
| JP | 2005-149844 A | 6/2005 |
| JP | 2005-235408 A | 9/2005 |
| JP | 2005-243565 A | 9/2005 |
| JP | 2006-40752 A | 2/2006 |

* cited by examiner

*Primary Examiner* — David Vu
(74) *Attorney, Agent, or Firm* — Kenyon & Kenyon LLP

(57) ABSTRACT

A fuel cell assembly and inspection device comprising a first base plate on which can be mounted a fuel cell stack including a current collecting plate placed on a first end plate and a plurality of unit cells stacked on the current collecting plate, and a pressure cylinder for pressing the stack, assembles a fuel cell by fixing a second end plate to a pressed stack. The device is provided with fuel gas supply piping, fuel gas discharge piping, oxidizing agent gas supply piping, oxidizing agent gas discharge piping, cooling medium supply piping, and cooling medium discharge piping which are connected, respectively, with a fuel gas supply port, a fuel gas discharge port, an oxidizing agent gas supply port, an oxidizing agent gas discharge port, a cooling medium supply port, and a cooling medium discharge port, which are provided on the first end plate.

5 Claims, 12 Drawing Sheets (A)    (B)

FUEL CELL ASSEMBLY AND INSPECTION DEVICE

TECHNICAL FIELD

The present invention relates to a device for assembling and inspecting fuel cells, and, in particular, to a fuel cell assembly and inspection device comprising a base plate for mounting a fuel cell stack including a first end plate, a current collecting plate placed on the first end plate and a plurality of unit cells stacked on the current collecting plate, and pressing means for pressing the fuel cell stack, wherein the device assembles the fuel cell by fixing a second end plate to the pressed fuel cell stack.

BACKGROUND ART

The high efficiency and superior environmental characteristic of fuel cells has received attention in recent years. Fuel cells generally produce electrical energy by a hydrogen fuel gas to chemically react with oxygen in the air. The chemical reaction of oxygen with hydrogen results in production of water. Fuel cells include phosphoric-acid fuel cells, molten carbonate fuel cells, solid-oxide fuel cells, alkaline fuel cells, and proton exchange membrane fuel cells. Among these, proton exchange membrane fuel cells have received particular attention for their advantages of being room temperature start-up, fast start-up time, and the like. Therefore, proton exchange membrane fuel cells are used most often in vehicles, e.g. automobiles.

A proton exchange membrane fuel cell is assembled by stacking a plurality of unit cells, current collecting plates, end plates and the like. The assembled fuel cell is then subjected to a power generation inspection, a gas leak inspection, and the like. For example, Japanese Patent Laid-Open Publication No. 2001-23665 (Patent Document 1) describes a gas leak test method for testing a gas leak of a fuel gas or oxidizing agent gas in a fuel cell stack Conventionally, assembly and inspection of a fuel cell is conducted by first inspecting the unit cells, then assembling the fuel cell, and finally the power generation performance of the assembled fuel cell. For power generation inspection of the unit cells, first, a plurality of unit cells are stacked in a unit cell power generation inspection jig. Then, the power generation inspection of the unit cell is conducted by supplying a fuel gas for inspection, an oxidizing agent gas for inspection, and a cooling medium for inspection to the plurality of stacked unit cells. After the power generation inspection of the unit cell, each unit cell is taken out from the unit cell power generation inspection jig. If a defective unit cell is detected, it is replaced by a non-defective unit cell.

After the power generation inspection of the unit cells, a plurality of unit cells, current collecting plates, and the like are stacked to form a fuel cell stack with a stacking jig, and then, by attaching an end plate and the like to the fuel cell stack, a fuel cell is assembled. Next, the assembled fuel cell is taken out from the stacking jig, and supply piping and discharge piping, and the like for inspection fuel gas, oxidizing agent gas, cooling medium and the like are fixed to the fuel cell, and thereafter the power generation capability of the fuel cell is tested. After the power generation inspection of the fuel cell, supply and discharge piping and the like for inspection fuel gas, oxidizing agent gas, cooling medium and the like are all removed from the fuel cell.

Thus, during assembly and inspection of the fuel cell, because the power generation inspection of unit cells, fuel cell assembly, and power generation inspection of the fuel cells are all performed conducted using different jigs and devices, the jigs and devices must be assembled and removed for each power generation inspection. Also, for power generation inspection of the fuel cell, the supply and discharge piping and the like for inspection fuel gas, oxidizing agent gas, cooling medium, and the like are installed on and removed from each assembled fuel cell. Therefore, conventional assembly and inspection has disadvantages of increased labor for assembly and reduced productivity.

Accordingly, it is an advantage of the present invention to provide a fuel cell assembly and inspection device which reduces the number of man-hours required for assembly and inspection while also improving manufacturing productivity in the fuel cell.

DISCLOSURE OF THE INVENTION

A fuel cell assembly and inspection device according to the present invention comprises a base plate for mounting a fuel cell stack including a first end plate, a current collecting plate placed on the first end plate, and a plurality of unit cells stacked on the current collecting plate, and pressing means for pressing the fuel cell stack, wherein the device assembles a fuel cell by fixing a second end plate to a pressed fuel cell stack, wherein the equipment has a fuel gas supply passage for supplying a fuel gas for inspection to the fuel cell stack, a fuel gas discharge passage for discharging a fuel gas for inspection from the fuel cell stack, an oxidizing agent gas supply passage for supplying an oxidizing agent gas for inspection to the fuel cell stack, an oxidizing agent gas discharge passage for discharging an oxidizing agent gas for inspection from the fuel cell stack, a cooling medium supply passage for supplying a cooling medium for inspection to the fuel cell stack, and a cooling medium discharge passage for discharging a cooling medium for inspection from the fuel cell stack, and wherein the fuel gas supply passage, the fuel gas discharge passage, the oxidizing agent gas supply passage, the oxidizing agent gas discharge passage, the cooling medium supply passage, and the cooling medium discharge passage are connected, respectively, with a fuel gas supply port, a fuel gas discharge port, an oxidizing agent gas supply port, an oxidizing agent gas discharge port, a cooling medium supply port, and a cooling medium discharge port, which are provided on the first end plate.

A fuel cell assembly and inspection device according to the present invention may be configured such that the fuel gas supply passage, the fuel gas discharge passage, the oxidizing agent gas supply passage, the oxidizing agent gas discharge passage, the cooling medium supply passage, and the cooling medium discharge passage are connected, respectively, with the fuel gas supply port, the fuel gas discharge port, the oxidizing agent gas supply port, the oxidizing agent gas discharge port, the cooling medium supply port, the cooling medium discharge port which are provided on the first end plate, through openings provided on a base plate.

A fuel cell assembly and inspection device according to the present invention may be configured such that the equipment comprises a guide member for guiding a plurality of stacked unit cells in a stacking direction and formed of an insulating material.

A fuel cell assembly and inspection device according to the present invention may be configured such that the equipment comprises a guide member for guiding a plurality of stacked unit cells in a stacking direction, and a floating mechanism for maintaining non-contact between the plurality of stacked unit cells and the guide member during a power generation inspection.

A fuel cell assembly and inspection device according to the present invention may be configured such that the second end plate is fixed to the fuel cell stack with a tension plate.

A fuel cell assembly and inspection device according to the present invention may be configured such that assembly and inspection of a plurality of fuel cell stacks are conducted simultaneously.

When a fuel cell assembly and inspection device of the present invention as described above is employed, because the power generation inspection of the unit cell, the assembly of the fuel cell, and the power generation inspection of the fuel cell can all be performed using only the assembly and inspection device, the labor required for fuel cell assembly and inspection may be reduced, while also improving manufacturing productivity in the fuel cell.

BEST MODE FOR CARRYING OUT THE INVENTION

Figure 1:
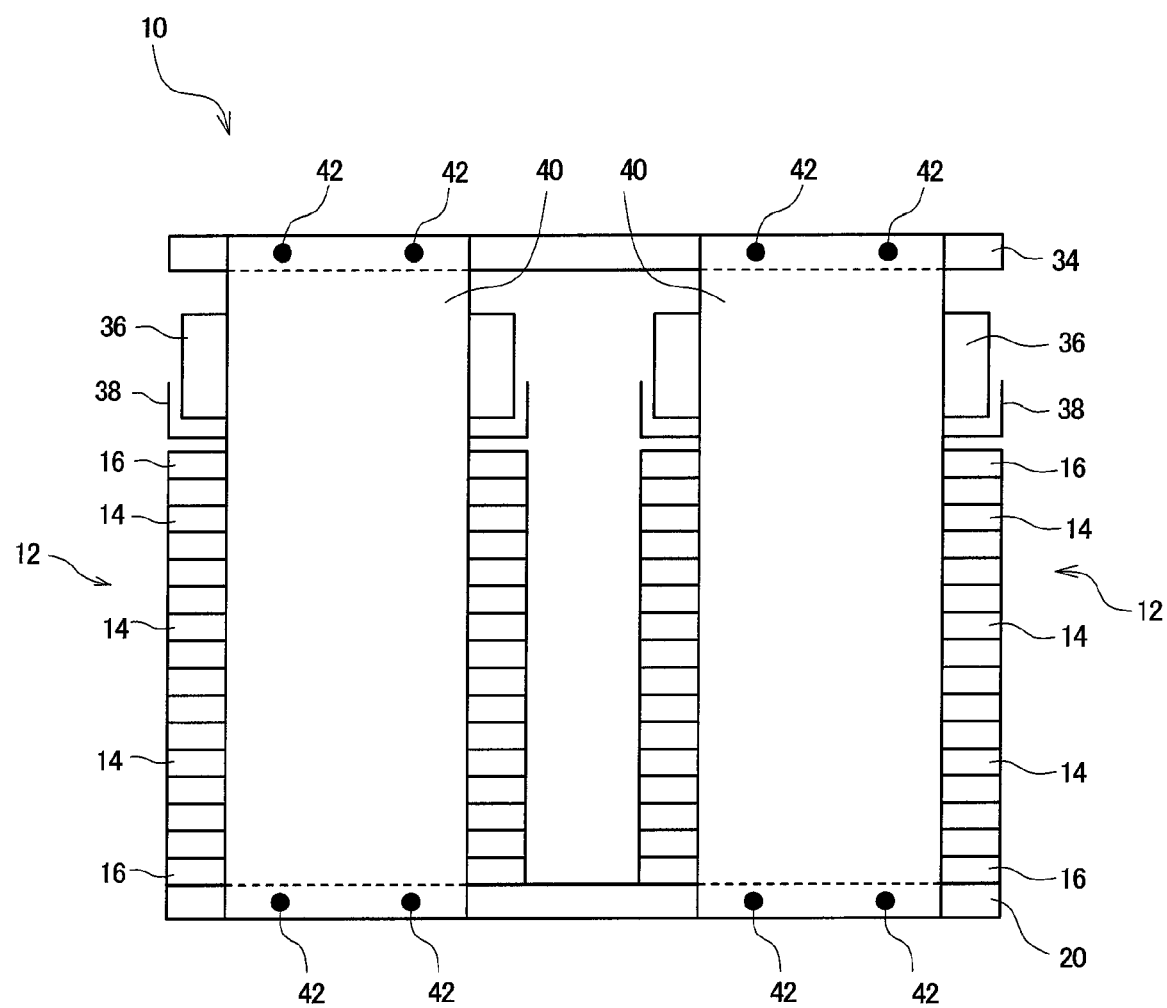
FIG. 1 is a schematic illustration of a fuel cell according to an embodiment of the present invention.

An embodiment of the present invention will be described in detail below with reference to the drawings. A configuration of a fuel cell will now be described. FIG. 1 is a schematic illustration of a fuel cell 10. The fuel cell 10 shown in FIG. 1 has an arrangement of two rows of fuel cell stacks 12. The arrangement of the fuel cell stacks 12 in the fuel cell 10 is, of course, not limited to two rows. The fuel cell stack 12 is formed by stacking a plurality of unit cells 14, a current collecting plate 16, and the like.

A unit cell 14 is constituted such that a catalyst layer stacked on each side of an electrolyte membrane and a gas diffusion layer stacked on each catalyst layer constitute a membrane electrode assembly, and a separator is stacked on the membrane electrode assembly.

The electrolyte membrane has a function of moving hydrogen ions generated on an anode side to a cathode side. An ion exchange membrane of a chemically stable fluorocarbon resin, e.g. Perfluorocarbonsulphonic acid is used as a material for the electrolyte membrane.

The catalyst layer has a function of promoting the oxidation reaction of hydrogen on the anode side and the reduction reaction of oxygen on the cathode side. The catalyst layer includes a catalyst and a catalyst carrier. Generally, a catalyst in particulate form is adhered to the catalyst carrier in order to increase the electrode reaction area. Platinum or other platinum-group elements with small activation overvoltage for oxidation reaction of hydrogen and the reduction reaction of oxygen are often used as the catalyst. A carbon material such as a carbon black is commonly used as the catalyst carrier.

The gas diffusion layer functions to diffuse gases, such as, for example, hydrogen gas, a fuel gas, and an oxidizing agent gas, into the catalyst layer, and of moving electrons.

A carbon fiber fabric, carbon paper, or other electrically conductive material may be used as the gas diffusion layer. The membrane electrode assembly may be assembled by stacking and heat pressing the electrolyte membrane, the catalyst layer and the gas diffusion layer.

The separator is stacked on the gas diffusion layer of the membrane electrode assembly, and has a function of separating a fuel gas and an oxidizing agent gas in the unit cells 14 provided adjacent thereto. Moreover, the separator has a function of electrically connecting unit cells 14 provided adjacent thereto. In the separator are formed a gas channel through which a fuel gas and an oxidizing agent gas flow, a cooling medium channel through which a cooling medium such as LLC (Long Life Coolant) and cooling water and the like to cool the unit cell 14 flows, and the like. The separator may be formed of a metal material such as stainless steel, a carbon material, or other suitable electrically conductive material.

The current collecting plate 16 has a function of collecting a direct-current generated at a plurality of stacked unit cells 14. A metal material such as stainless steel or copper, a carbon material, or other suitable electrically conductive material may be used as the current collecting plate 16. The metal sheet material such as stainless steel and copper, which is gold plated, may be also used for the current collecting plate 16.

Figure 2:
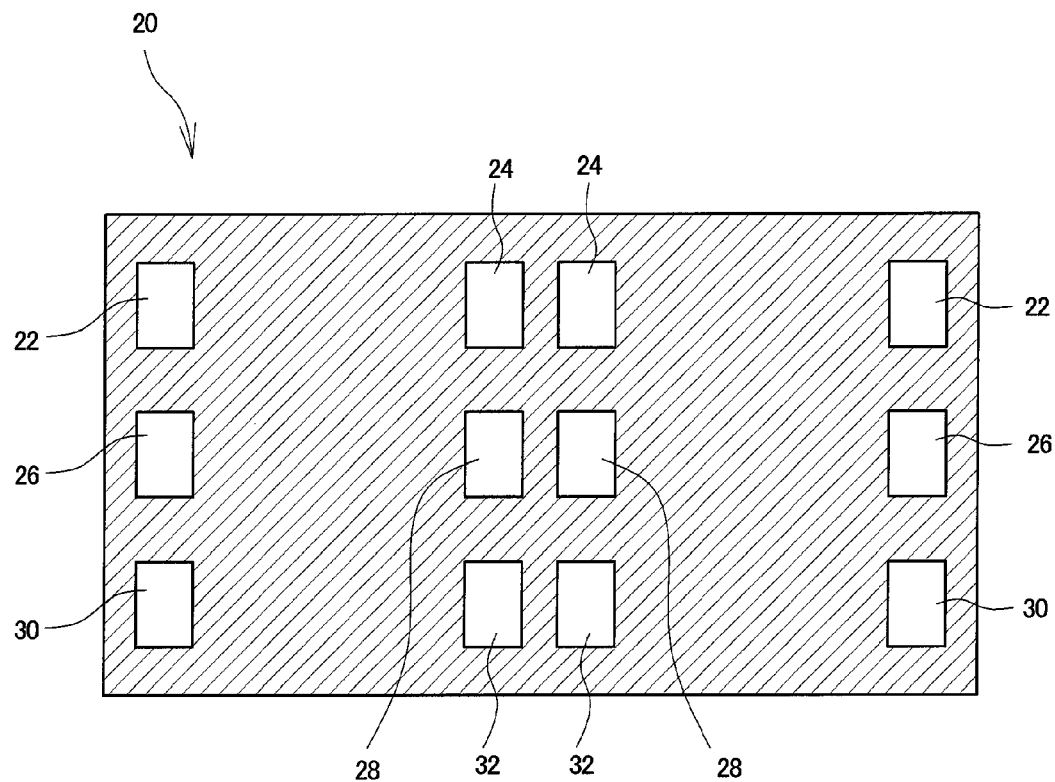
FIG. 2 is a schematic illustration of a first end plate according to an embodiment of the present invention.

The end plates 20, 34 are mounted at both ends of the fuel cell stack 12. The end plates 20, 34 may be formed of a metal material such as stainless steel. In the first end plate 20, openings are provided for supplying and discharging a fuel gas, an oxidizing agent gas, and a cooling medium. FIG. 2 is a schematic illustration of the first end plate 20. The first end plate 20 is provided with a fuel gas supply port 22 for supplying a fuel gas to the fuel cell stack 12, a fuel gas discharge port 24 for discharging an electrochemically-reacted fuel gas from the fuel cell stack 12, an oxidizing agent gas supply port 26 for supplying an oxidizing agent gas to the fuel cell stack 12, an oxidizing agent gas discharge port 28 for discharging an electrochemically-reacted oxidizing agent gas from the fuel cell stack 12, a cooling medium supply port 30 for supplying a cooling medium to the fuel cell stack 12, and a cooling medium discharge port 32 for discharging a cooling medium from the fuel cell stack 12.

In the fuel gas supply port 22, the fuel gas discharge port 24, the oxidizing agent gas supply port 26, the oxidizing agent gas discharge port 28, the cooling medium supply port 30, and the cooling medium discharge port 32, seal grooves are formed around the openings, respectively. An O ring, a gasket or the like, made of rubber or the like, for sealing a fuel gas, an oxidizing agent gas, and a cooling medium is fitted into each seal groove. Because two rows of fuel stacks are provided in the fuel cell 10 shown in FIG. 1, fuel gas supply ports 22, fuel gas discharge ports 24, oxidizing agent gas supply ports 26, oxidizing agent gas discharge ports 28, cooling medium supply ports 30, and cooling medium discharge ports 32 are provided at two locations in the first end plate 20.

In FIG. 1, as described below, an opening for passing an actuator or the like of a pressure cylinder for applying pressure on the fuel cell stack 12 therethrough is provided in the second end plate 34 for each fuel cell stack 12. In the fuel cell 10 shown in FIG. 1, the openings are provided at two locations in the second end plate 34 because two rows of fuel cell stack 12 are provided. A load adjusting screw for adjusting a load to apply pressure on the fuel cell stack 12 is also provided for each fuel cell stack 12 in the second end plate 34.

A spring box 36 has functions of increasing the uniformity of the pressure applied on the fuel cell stack 12 and of measuring a load that is loaded to the fuel cell stack 12. The spring box 36 is arranged between the second end plate 34 and an insulating member 38 in the fuel cell stack. The spring box 36 is provided with a plurality of springs between two pressure plates. Therefore, the uniformity of pressure applied to the fuel cell stack 12 can be further increased by applying pressure on the fuel cell stack 12 through the spring box 36, and the load the fuel cell stack 12 can be measured according to the amount of displacement of the spring. Of course, the arrangement thereof is not limited to the spring box 36, and pressure plates or the like with load cells may be employed, e.g., at 2 to 12 locations.

A tension plate 40 is fixed to the first end plate 20 and the second end plate 34, e.g. with bolts 42. Two tension plates 40 are fixed to the fuel cell stack 12 for each fuel cell stack 12. The tension plate 40 has a function of applying pressure on the fuel cell stack 12 at a predetermined pressure. This ensures sealing property of a fuel gas, an oxidizing agent gas, and a cooling medium, e.g. between the unit cells 14, between the unit cell 14 and the current collecting plate 16, and between the current collecting plate 16 and the first end plate 20.

Figure 3:
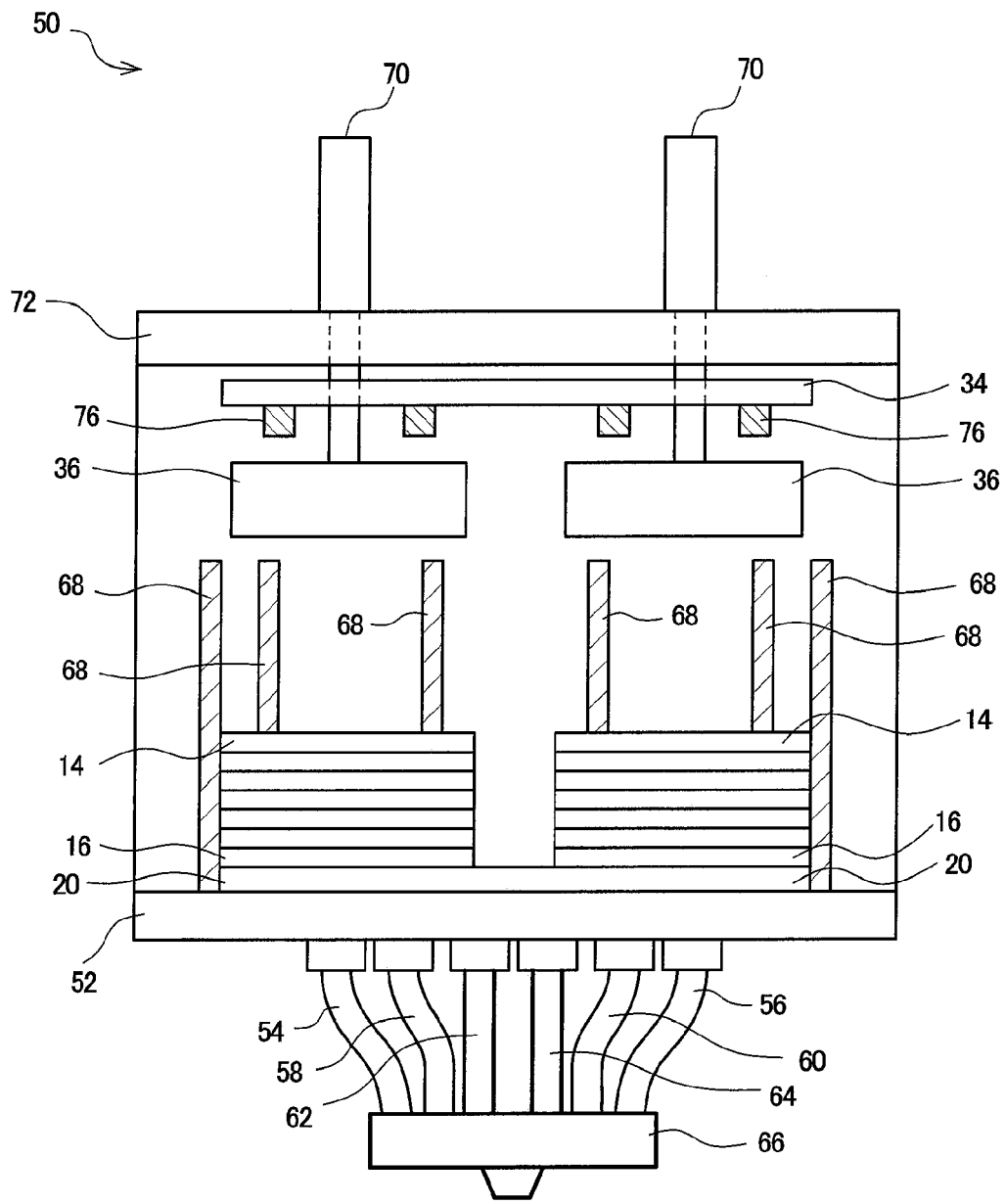
FIG. 3 is a schematic illustration of fuel cell assembly and inspection device according to an embodiment of the present invention.

A configuration of fuel cell assembly and inspection device will now be described. FIG. 3 is a schematic illustration of fuel cell assembly and inspection device 50.

A first base plate 52 is a base plate for mounting the fuel cell stack 12 including the first end plate 20, the current collecting plate 16 placed on the first end plate 20, and the plurality of unit cells 14 stacked on the current collecting plate 16. The first base plate 52 may be formed of a metal material such as stainless steel.

A plurality of rows of fuel cell stacks 12 can be mounted on the first base plate 52. Although FIG. 3 shows an example in which two rows of fuel cell stacks 12 mounted on the first base plate 52, the configuration of the fuel cell stack 12 is, of course, not limited to two rows, and one row or three or more may be provided.

Fuel gas supply piping 54, fuel gas discharge piping 56, oxidizing agent gas supply piping 58, oxidizing agent gas discharge piping 60, cooling medium supply piping 62, and cooling medium discharge piping 64 are connected to the first base plate 52. The fuel gas supply piping 54 may be, for example, a fuel gas supply passage for supplying a fuel gas for inspection such as hydrogen gas to the fuel cell stack 12, and the fuel gas discharge piping 56 is a fuel gas discharge passage for discharging an electrochemically-reacted fuel gas for inspection from the fuel cell stack 12. The oxidizing agent gas supply piping 58 may be, for example, an oxidizing agent gas supply passage for supplying an oxidizing agent gas for inspection such as air to the fuel cell stack 12, and the oxidizing agent gas discharge piping 60 is an oxidizing agent gas discharge passage for discharging an electrochemically-reacted oxidizing agent gas for inspection from the fuel cell stack 12. The cooling medium supply piping 62 may be, for example, a cooling medium supply passage for supplying a cooling medium for inspection such as LLC to the fuel cell stack 12, and the cooling medium discharge piping 64 is a cooling medium discharge passage for discharging a cooling medium for inspection after having cooled the fuel cell stack 12 from the fuel cell stack 12.

The fuel gas supply piping 54, the fuel gas discharge piping 56, the oxidizing agent gas supply piping 58, the oxidizing agent gas discharge piping 60, the cooling medium supply piping 62, and the cooling medium discharge piping 64 are all connected to the first base plate 52 so as to be connectable with the respective fuel gas supply port 22, fuel gas discharge port 24, oxidizing agent gas supply port 26, oxidizing agent gas discharge port 28, cooling medium supply port 30, the cooling medium discharge port 32 provided on the first end plate 20.

Because connecting portion having a floating mechanism is preferably provided between the first base plate 52 and the first end plate 20, even if an end of the first end plate 20 warps or bends during power generation inspection for the fuel cell 10, the connecting portion follows it with the floating mechanism, thereby ensuring the seal of the fuel gas for inspection, oxidizing agent gas for inspection, and cooling medium for inspection between the first base plate 52 and the first end plate 20. Moreover, when the connecting portion having the floating mechanism is provided between the first base plate 52 and the first end plate 20, it is preferable that the first base plate 52 be made flatter in order to further improve sealing property between the first base plate 52 and the first end plate 20.

In the first base plate 52, openings for passing the fuel gas supply piping 54, the fuel gas discharge piping 56, the oxidizing agent gas supply piping 58, the oxidizing agent gas discharge piping 60, the cooling medium supply piping 62, and the cooling medium discharge piping 64 may be provided to allow the fuel gas supply piping 54, the fuel gas discharge piping 56, the oxidizing agent gas supply piping 58, the oxidizing agent gas discharge piping 60, the cooling medium supply piping 62, and the cooling medium discharge piping 64 to be directly connected to the fuel gas supply port 22, the fuel gas discharge port 24, the oxidizing agent gas supply port 26, the oxidizing agent gas discharge port 28, the cooling medium supply port 30, and the cooling medium discharge port 32 which are provided on the first end plate 20, respectively, using screw connectors or the like. This helps suppress leakage of the fuel gas for inspection, oxidizing agent gas for inspection, and cooling medium for inspection even when the first end plate 20 bends or warps when fixed to the tension plate 40.

When two rows of fuel cell stacks 12 are mounted on the first base plate 52 as shown in FIG. 3, the fuel gas supply piping 54, the fuel gas discharge piping 56, the oxidizing agent gas supply piping 58, the oxidizing agent gas discharge piping 60, the cooling medium supply piping 62, and cooling medium discharge piping 64, which are respectively branched into two pipes, are connected to the fuel gas supply port 22, the fuel gas discharge port 24, the oxidizing agent gas supply port 26, the oxidizing agent gas discharge port 28, the cooling medium supply port 30, and the cooling medium discharge port 32, which are provided on the first end plate 20 of the fuel cell stack 12, respectively.

Moreover, the fuel gas supply piping 54, the fuel gas discharge piping 56, the oxidizing agent gas supply piping 58, the oxidizing agent gas discharge piping 60, the cooling medium supply piping 62, and the cooling medium discharge piping 64 are preferably connected to a common connector 66 as the six pipings can then be connected through the common connector 66 at one location to a feed unit for supplying a fuel gas for inspection, an oxidizing agent gas for inspection, and a cooling medium for inspection.

A guide member 68 has a function as a reference for guiding the plurality of stacked unit cells 14 in a stacking direction, and is fixed to the first base plate 52 so as to be in contact with the unit cell 14. The unit cells 14 can be more uniformly stacked by guiding the plurality of unit cells 14 in a stacking direction to abut the guide member 68. As shown in FIG. 3, for example, the guide member 68 is preferably provided on the anterior of the fuel cell stack 12 at two locations and on the side thereof at one location for each fuel cell stack 12. Of course, the arrangement of a guide member 68 is not limited to this arrangement, and other arrangements may be employed in consideration of other conditions. Also, the guide member 68 may be provided with a mechanism capable of adjusting a length of the guide member 68 according to the height of the fuel cell stack 12.

The guide member 68 is preferably formed of an insulating material, as forming the guide member 68 formed of an insulating material can prevent short circuiting between the guide member 68 and the plurality of stacked unit cells 14 and enable conducting power generation tests without removing the guide member 68 from the fuel cell assembly and inspection device 50. For example, a synthetic resin material such as an epoxy resin or a ceramic material such as aluminum oxide may be used as the insulating material. PEEK (polyether ether ketone) resin is preferably used as the insulating material. Although use of a guide member 68 made of PEEK resin improves stacking accuracy because PEEK resin has greater heat resistance than an epoxy resin, the insulating material is, of course, not limited to the above materials.

In cases where the guide member 68 is formed of a metal material such as stainless steel, a floating mechanism capable of maintaining non-contact between the plurality of stacked unit cells 14 and the guide member 68 is preferably provided, because the guide member 68 can be slid backward with the floating mechanism in order preventing short circuiting due to contact between the plurality of stacked unit cells 14 and the guide member 68. Accordingly, the power generation inspection can be conducted without removing the guide member 68 from the fuel cell assembly and inspection device 50.

During power generation inspection, when it is necessary to hold the fuel cell stack 12 due to non-contact between the plurality of stacked unit cells 14 and the guide member 68, a holding member having the floating mechanism, formed of an insulating material, and for receiving and holding the fuel cell stack 12 may be provided. This is an especially important consideration when the fuel cell assembly and inspection device 50 is a horizontal type, as it is then particularly necessary to hold the fuel cell stack 12. The above-described synthetic resin material, ceramic material or the like may be used as the insulating material. The above floating mechanism may use a floating mechanism commonly used for moving a member.

A pressure cylinder 70 serves as pressing means for applying pressure to the fuel cell stack 12, which is arranged in a second base plate 72. An actuator of the pressure cylinder 70 is inserted from the opening portion formed in the second end plate 34, and is capable of applying pressure on the fuel cell stack 12 via the spring box 36 and the like. This can improve sealing property of a fuel gas for inspection, an oxidizing agent gas for inspection, and a cooling medium for inspection between unit cells 14, between the unit cell 14 and the current collecting plate 16, between the current collecting plate 16 and the end plate, and the like. A common hydraulic servo cylinder or the like may be used as the pressure cylinder 70. The pressing means are, of course, not limited to the pressure cylinder 70, and pressure may be applied to the fuel cell stack 12 using other means, such as, for example, a ball screw or the like.

A pressing point in applying pressure on the fuel cell stack 12 with the pressure cylinder 70 via the spring box 36 and the like is preferably provided at, for example, a location different from that of a pressing point in adjusting a load with a load adjusting screw 76 provided in the second end plate 34. Therefore, the tension plate 40 can be attached to the first end plate 20 and the second end plate 34 in a state in which a load is not loaded by loading a preload to the fuel cell stack 12 with the pressure cylinder 70. Therefore, the tension plate 40 can be easily attached at predetermined attaching position, and this may improve flexibility in attaching the tension plate 40.

When a plurality of rows of fuel cell stacks 12 are provided on the first base plate 52, a pressure cylinder 70 is preferably provided for each fuel cell stack 12. For example, when two rows of fuel cell stacks 12 are provided on the first base plate 52 as shown in FIG. 3, one pressure cylinder 70 is provided on each fuel cell stack 12, such that that a total of two pressure cylinders 70 are mounted on the second base plate 72. Because a load can be individually loaded by providing the pressure cylinder 70 for each fuel cell stack 12 in this manner, the load on each of the fuel cell stacks 12 can be easily adjusted more easily than when a uniform pressure is applied on the plurality of rows of fuel cell stacks 12 with one pressure cylinder 70.

A method of assembling and inspecting the fuel cell 10 will now be described. First, the first end plate 20 and the second end plate 34 are set in the fuel cell assembly and inspection device 50. The first end plate 20 is then mounted on the first base plate 52. Then, the fuel gas supply port 22, the fuel gas discharge port 24, the oxidizing agent gas supply port 26, the oxidizing agent gas discharge port 28, the cooling medium supply port 30, and the cooling medium discharge port 32 which are provided on the first end plate 20, are connected, respectively, with the fuel gas supply piping 54, the fuel gas discharge piping 56, the oxidizing agent gas supply piping 58, the oxidizing agent gas discharge piping 60, the cooling medium supply piping 62, and the cooling medium discharge piping 64.

The current collecting plate 16 is placed on the first end plate 20, the plurality of unit cells 14 are stacked on the current collecting plate 16 by guiding it in the stacking direction with the guide member 68. Another current collecting plate 16 is placed on the plurality of stacked unit cells 14, and the insulating member 38 is placed on the above another current collecting plate 16. Then, the spring box 36 is placed on the insulating member 38, so that the fuel cell stack 12 is formed.

Figure 4:
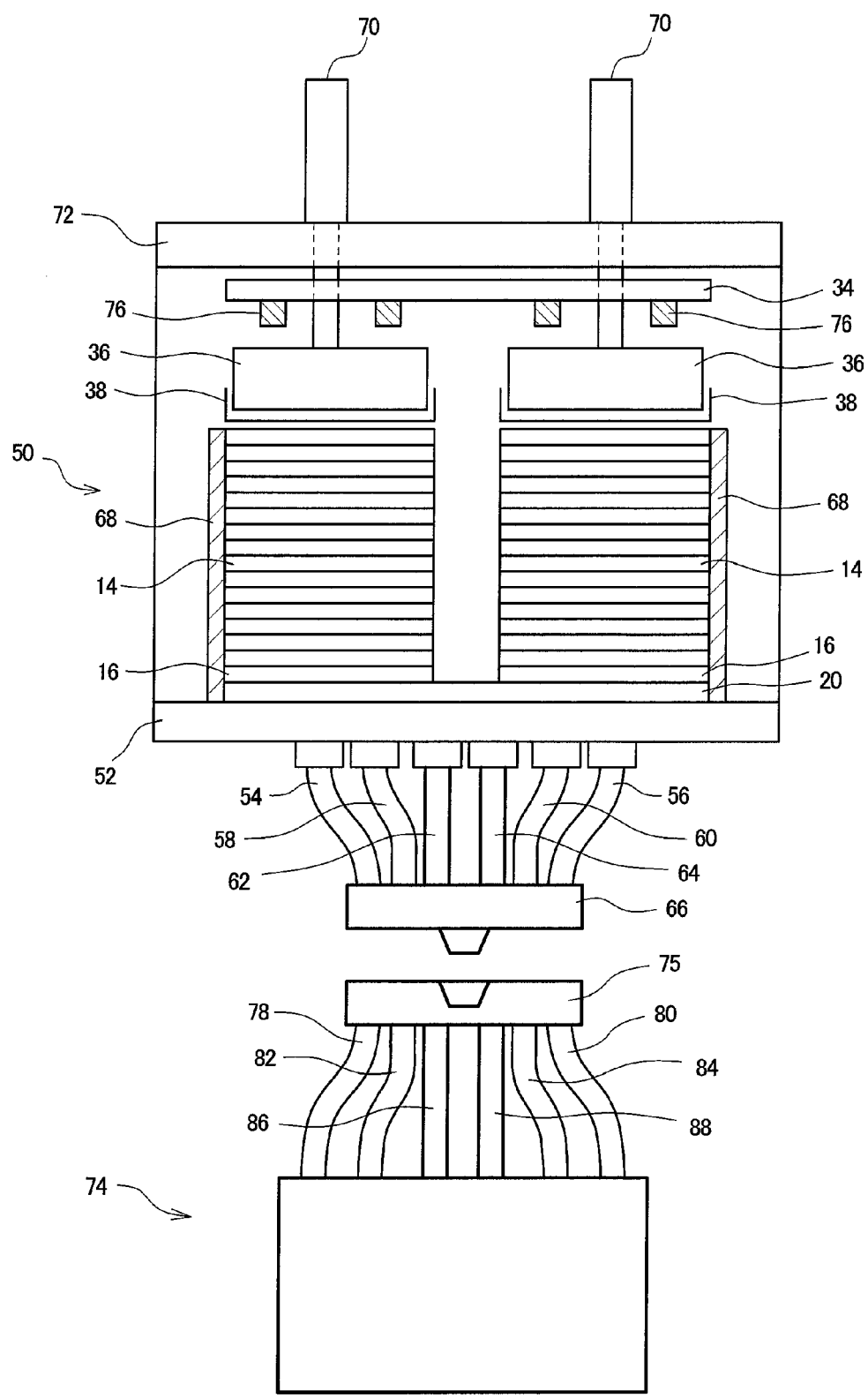
FIG. 4 is a view showing a power generation inspecting method of the unit cell in the fuel cell assembly and inspection device according to an embodiment of the present invention.

A power generation inspection of the unit cell 14 is conducted by applying pressure on the fuel cell stack 12 at a predetermined load with the pressure cylinder 70 via the spring box 36. FIG. 4 is a view showing a power generation inspecting method of the unit cell 14 in the fuel cell assembly and inspection device 50. Because the guide member 68 is formed of an insulating material, a power generation inspection of the unit cell 14 can be conducted without removing the guide member 68 from the fuel cell assembly and inspection device 50.

First, a feed unit 74 for supplying a fuel gas for inspection, an oxidizing agent gas for inspection, a cooling medium for inspection, and the fuel cell assembly and inspection device 50 are connected to each other through a connector 75 of the feed unit and the connector 66 of the fuel cell assembly and inspection device 50. Accordingly, the fuel gas supply piping 54, the fuel gas discharge piping 56, the oxidizing agent gas supply piping 58, the oxidizing agent gas discharge piping 60, the cooling medium supply piping 62, and the cooling medium discharge piping 64 which are comprised in the fuel cell assembly and inspection device 50 are connected, respectively, with a fuel gas supply piping 78, a fuel gas discharge piping 80, an oxidizing agent gas supply piping 82, an oxidizing agent gas discharge piping 84, a cooling medium supply piping 86, and a cooling medium discharge piping 88, which are incorporate in the feed unit 74.

A power generation inspection of the unit cell 14 is conducted as follows: a fuel gas for inspection is supplied from the fuel gas supply piping 54 to the fuel cell stack 12; an oxidizing agent gas is supplied from the oxidizing agent gas supply piping 58 to the fuel cell stack 12; a cooling medium is supplied from the cooling medium supply piping 62 to the fuel cell stack 12; a reaction gas subjected to an electrochemical reaction is discharged from the fuel cell stack 12 through the fuel gas discharge piping 56 and the oxidizing agent gas discharge piping 60; a cooling medium after having cooled is discharged from the fuel cell stack 12 through the cooling medium discharge piping 64. If a defective product is detected in a power generation inspection of the unit cell 14, the load of the pressure cylinder 70 is removed, and the defective product is then removed replaced.

After the power generation test of the unit cell, the fuel cell 10 is assembled by fixing the second end plate 34 to the fuel cell stack 12. In a state in which a preload is loaded to the fuel cell stack 12 by the pressure cylinder 70, the two load adjusting screws 76 provided on the second end plate 34 are connected to the spring box 36. Then, in a state in which the preload is loaded to the fuel cell stack 12, the tension plate 40 is fastened to the first end plate 20 and the second end plate 34 with a bolt or the like. After the tension plate 40 is attached, the fuel cell stack 12 is centered with the two load adjusting screws 76. After that, the preload loaded by the pressure cylinder 70 to the fuel cell stack 12 is removed, and then the load on the fuel cell stack 12 is adjusted using the load adjusting screw 76. The load on the fuel cell stack 12 is measured with the spring box 36. After the load on the fuel cell stack 12 is adjusted, the assembly of the fuel cell 10 is completed.

Figure 5:
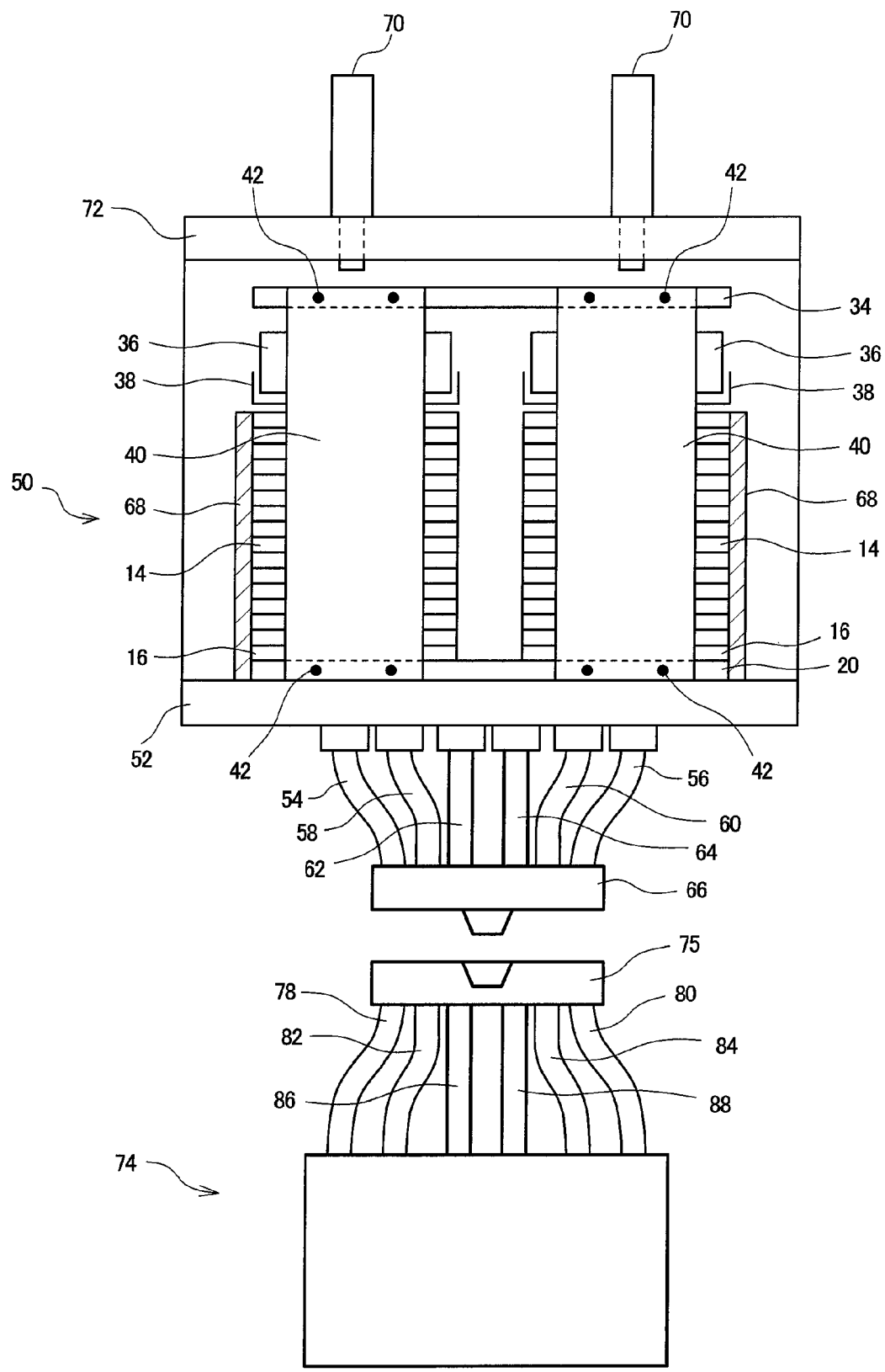
FIG. 5 is a view showing a power generation inspecting method of the fuel cell in the fuel cell assembly and inspection device according to an embodiment of the present invention.

A power generation inspection of the fuel cell 10 is subsequently conducted for the assembled fuel cell 10. FIG. 5 is a view showing a power generation inspecting method of the fuel cell 10 in the fuel cell assembly and inspection device 50. The power generation inspection of the fuel cell 10 is conducted with the fuel cell 10 fixed to the fuel cell assembly and inspection device 50. In the power generation inspection of the fuel cell 10, a power generation test can also be conducted without removing the guide member 68 from the fuel cell assembly and inspection device 50.

First, the power generation inspection of the fuel cell 10, as well as a power generation inspection of the unit cell, the feed unit 74 for supplying a fuel gas for inspection, an oxidizing agent gas for inspection, and a cooling medium for inspection, and the fuel cell assembly and inspection device 50 are connected to each other through the connector 75 of the feed unit 74 and the connector 66 of the fuel cell assembly and inspection device 50. Accordingly, the fuel gas supply piping 54, the fuel gas discharge piping 56, the oxidizing agent gas supply piping 58, the oxidizing agent gas discharge piping 60, the cooling medium supply piping 62, and the cooling medium discharge piping 64 which are incorporated into the fuel cell assembly and inspection device 50 are connected with the fuel gas supply piping 78, the fuel gas discharge piping 80, the oxidizing agent gas supply piping 82, the oxidizing agent gas discharge piping 84, the cooling medium supply piping 86, and the cooling medium discharge piping 88, respectively, which are incorporated in the feed unit 74.

Then, the power generation inspection of the fuel cell 10 is conducted as follows: a fuel gas for inspection is supplied from the fuel gas supply piping 54 to the fuel cell stack 12; an oxidizing agent gas for inspection is supplied from the oxidizing agent gas supply piping 58 to the fuel cell stack 12; a cooling medium for inspection is supplied from the cooling medium supply piping 62 to the fuel cell stack 12; a reaction gas subjected to an electrochemical reaction is discharged from the fuel cell stack 12 through the fuel gas discharge piping 56 and the oxidizing agent gas discharge piping 60; and the cooling medium for inspection which is passed through the fuel cell 10 is discharged from the fuel cell stack 12 through the cooling medium discharge piping 64. A power generation-inspected fuel cell 10 is removed from the fuel cell assembly and inspection device 50, and fixed to a case for a fuel cell.

Therefore, by employing a fuel cell assembly and inspection device as described above, because the power generation inspection of the unit cell, the assembly of the fuel cell, and the power generation inspection of the fuel cell can be conducted by the assembly and inspection device alone, the amount of labor required to assemble and inspect each fuel cell can be reduced, and the manufacturing productivity in the fuel cell can be improved.

By employing a fuel cell assembly and inspection device as described above in which the fuel gas supply passage, the fuel gas discharge passage, the oxidizing agent gas supply passage, the oxidizing agent gas discharge passage, the cooling medium supply passage, and the cooling medium discharge passage are directly connected to the first end plate through the openings provided in the base plate, leakage of a fuel gas for inspection, an oxidizing agent gas for inspection, and a cooling medium for inspection can be prevented, even if the first end plate is bent or warped by the tension plate.

By employing a fuel cell assembly and inspection device as described above, the guide member for guiding the plurality of stacked unit cells in the stacking direction and formed of an insulating material can prevent short circuiting between the unit cell and the guide member during the power generation inspection of the unit cell or during the power generation inspection of the fuel cell, and power generation inspection can be performed without removing the guide member from the assembly and inspection device.

By employing a fuel cell assembly and inspection device as described above in which the floating mechanism capable of maintaining non-contact between the guide member and the unit cell is provided, a short circuit between the unit cell and the guide member during the power generation inspection can be prevented, and the power generation inspection can be conducted without removing the guide member from the assembly and inspection device, even when the guide member is formed of an electrically conductive material such as a metal material.

Figure 6:
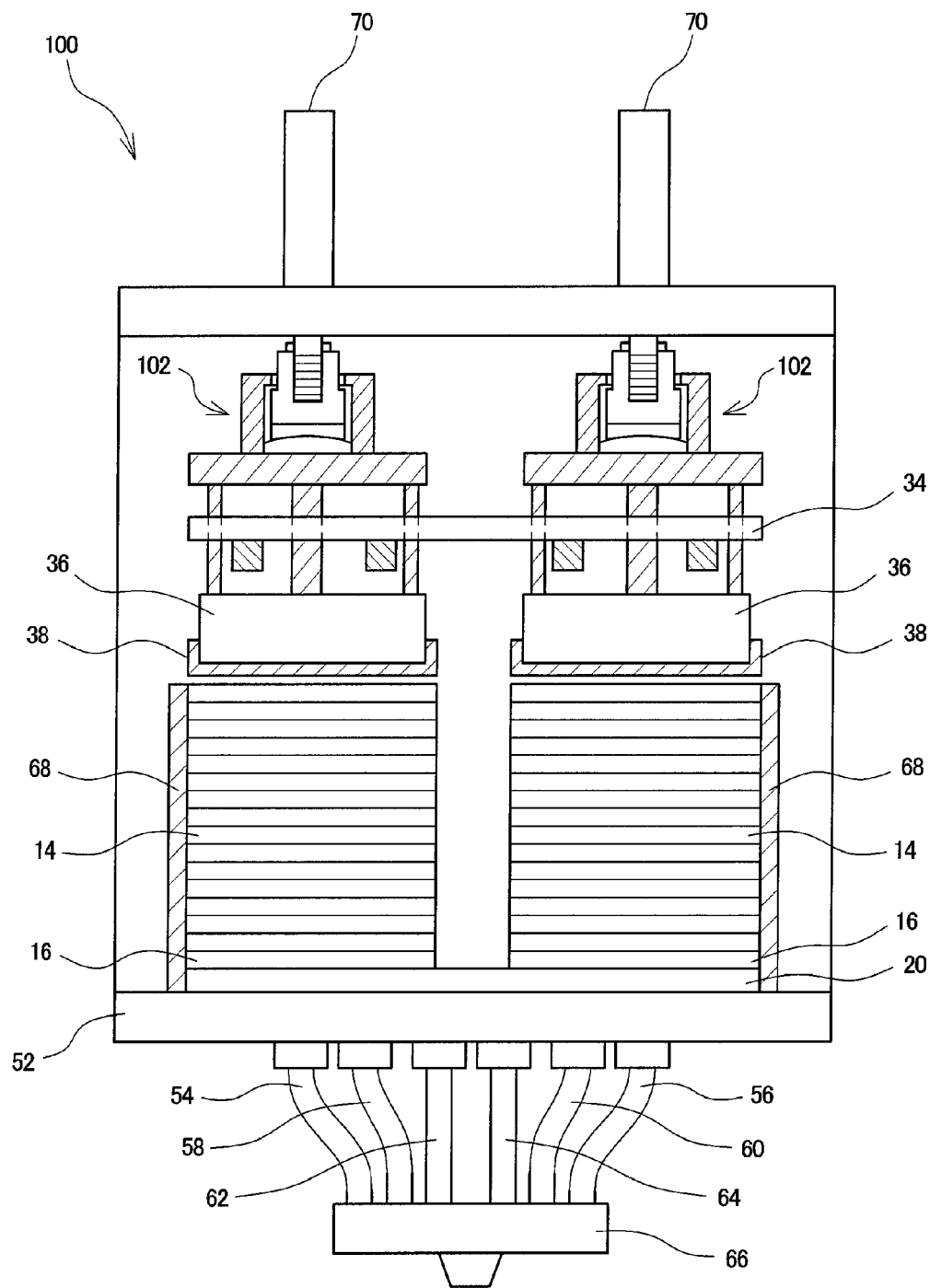
FIG. 6 is schematic illustration of fuel cell assembly and inspection device according to an embodiment of the present invention.
Figure 7:
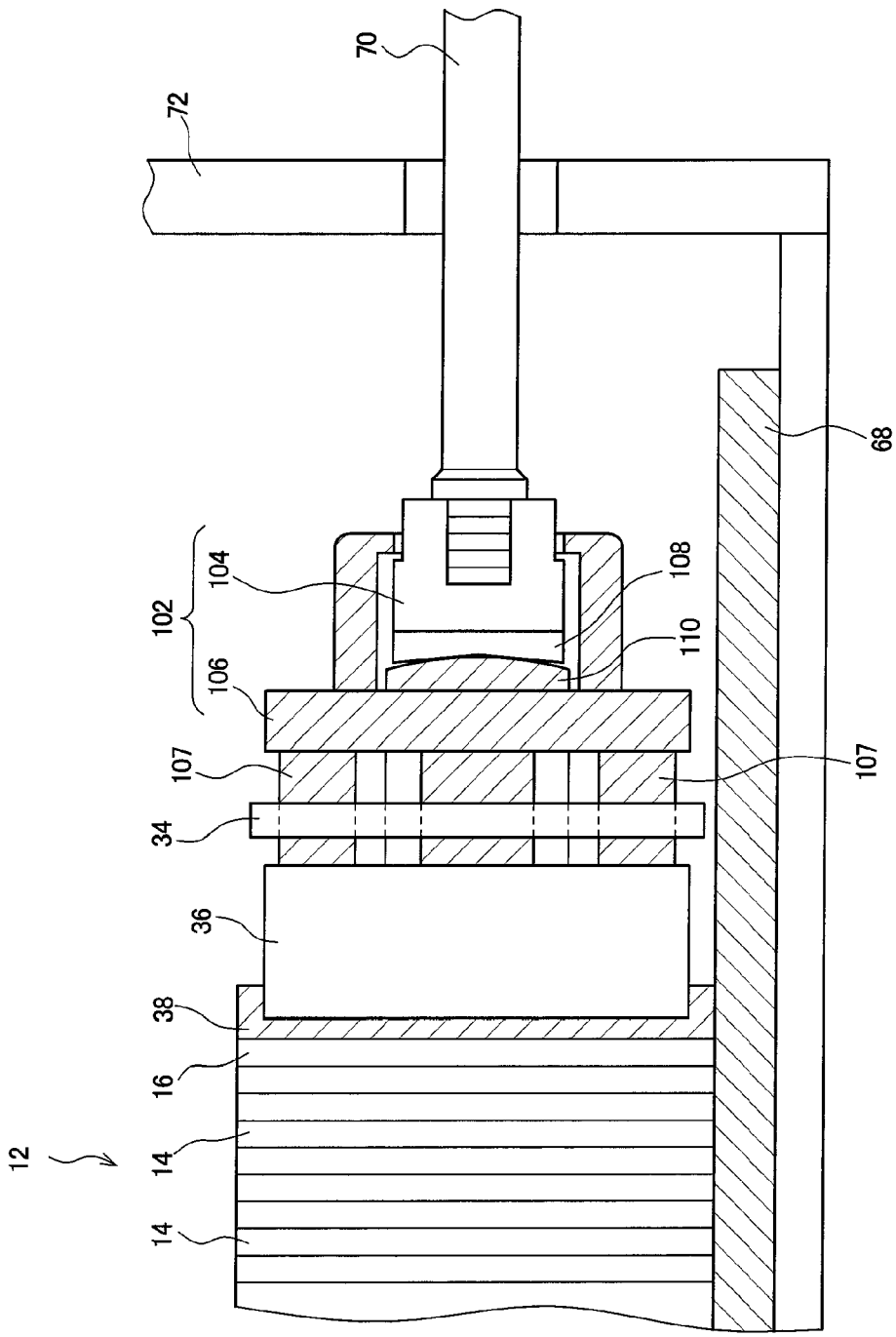
FIG. 7 is a side view showing a configuration of a pressure surface following mechanism comprised in the fuel cell assembly and inspection device according to an embodiment of the present invention.

A fuel cell assembly and inspection device according to another embodiment of the present invention will now be described. FIG. 6 is a schematic illustration of a fuel cell assembly and inspection device 100. In the following description, elements corresponding to those described above are designated by identical numerals, and their detailed description will not be repeated. The fuel cell assembly and inspection device 100 comprises a pressure surface following mechanism 102 which follows an inclination of an end face in the fuel cell stack 12. FIG. 7 is a side view showing a configuration of the pressure surface following mechanism 102 included in the fuel cell assembly and inspection device 100.

The pressure surface following mechanism 102, which includes a first metal base portion 104 fixed to the pressure cylinder 70 and a second metal base portion 106 for pressing the spring box 36, can apply pressure more uniformly on an inclined end face even when the end face of the fuel cell stack 12 is tilted or inclined. The first metal base portion 104 is provided with a thread groove or the like for fastening to the pressure cylinder 70. The second metal base portion 106 is provided with a plurality of pressure rods 107 for pressing the spring box 36. The pressure rod 107 is inserted from the opening formed in the second end plate 34 to press the spring box 36.

Figure 8:
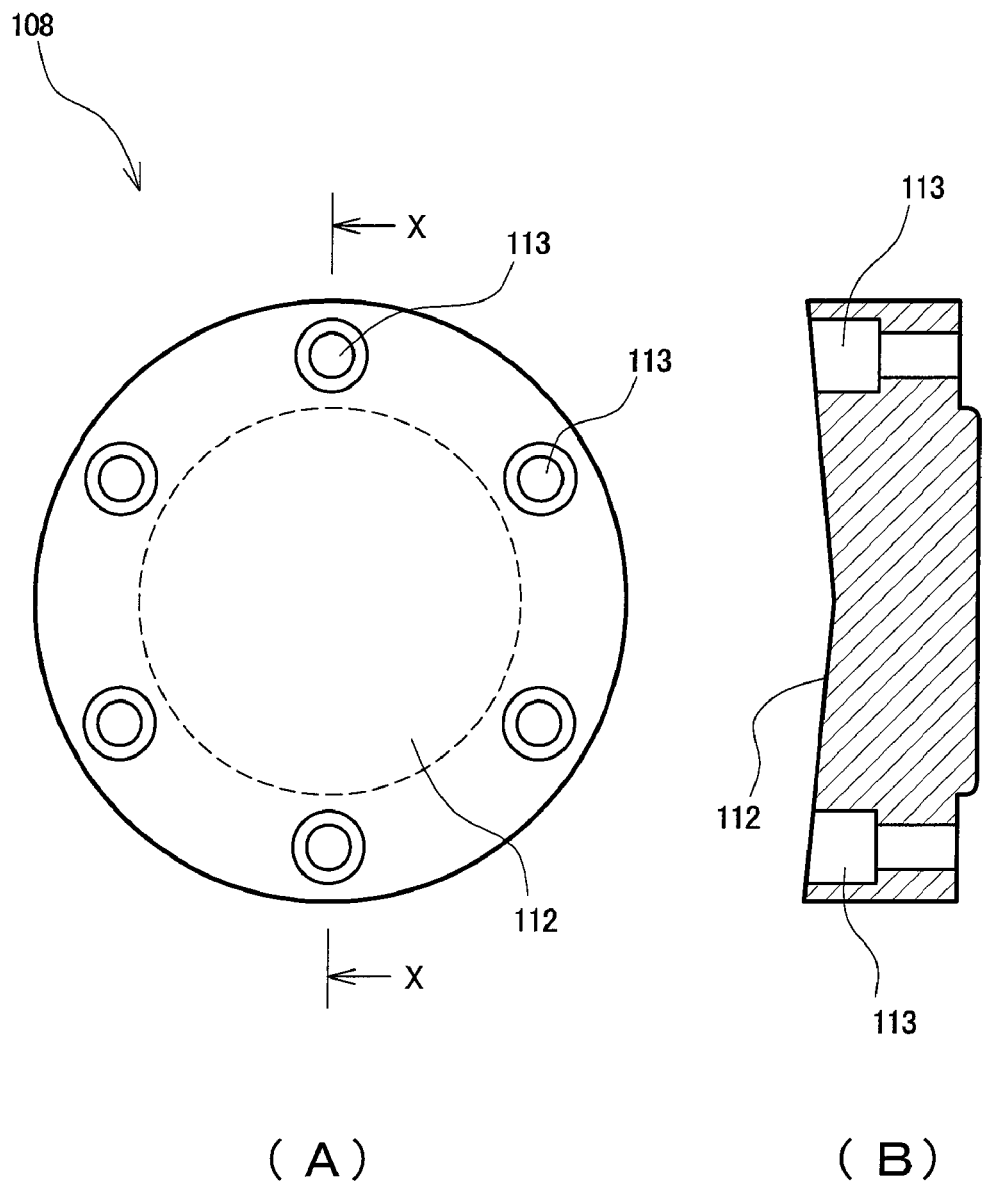
FIG. 8 is a schematic illustration of a concave member in a first metal base portion according to an embodiment of the present invention.
Figure 9:
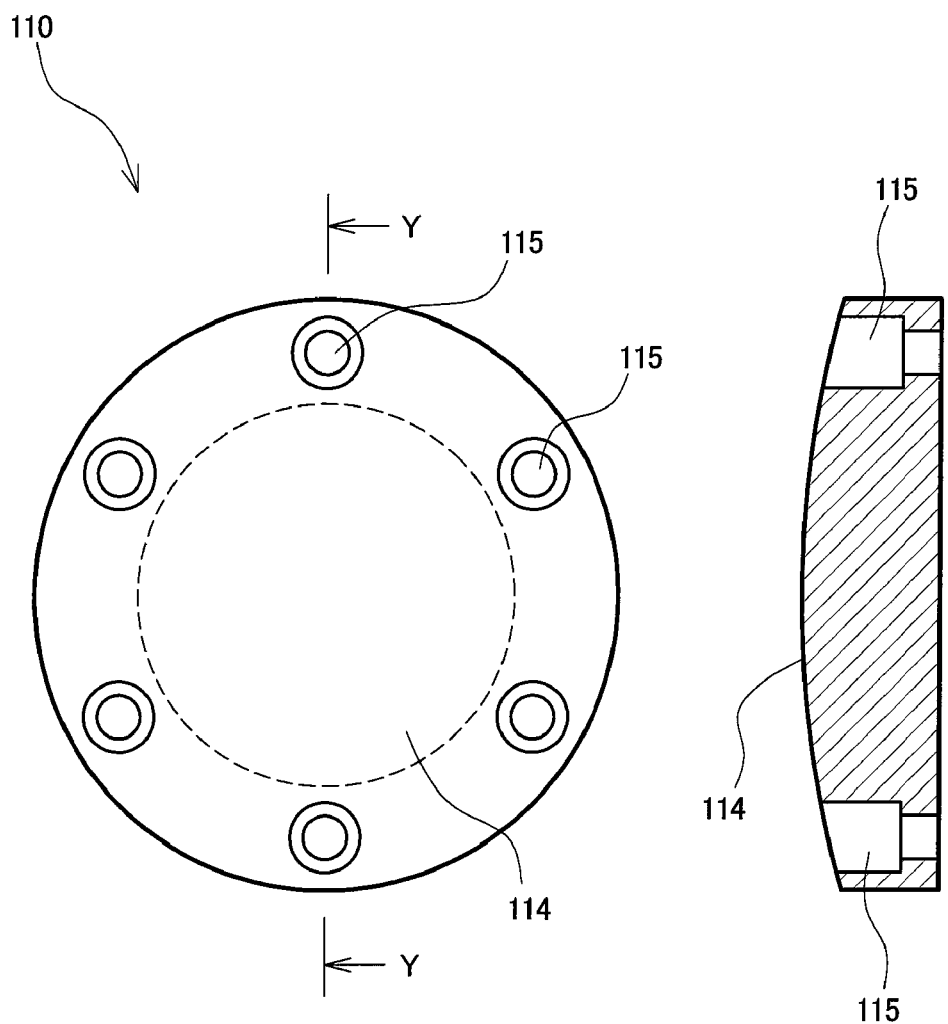
FIG. 9 is a schematic illustration of a convex member in a second metal base portion according to an embodiment of the present invention.

The first metal base portion 104 and the second metal base portion 106 are slidably assembled in order to apply pressure more uniformly on the inclined end face even when an inclination of the end face of the fuel cell stack 12 occurs. A concave member 108 is provided on the first metal base portion 104, and a convex member 110 is provided on the second metal base portion 106. FIG. 8 is a schematic illustration of the concave member 108 in the first metal base portion 104. FIG. 8(A) is a plan view of the concave member 108 and FIG. 8(B) is a sectional view taken along X-X of the concave member 108. The concave member 108 is provided with a concave surface 112 in contact with the convex member 110, and a plurality of fastening holes 113. FIG. 9 is a schematic illustration of the convex member 110 in the second metal base portion 106. FIG. 9(A) is a plan view of the convex member 110 and FIG. 9(B) is a sectional view taken along Y-Y of the convex member 110. The convex member 110 is provided with a convex surface 114 in contact with the concave member 108, and a plurality of fastening holes 115.

The first metal base portion 104 and the second metal base portion 106 are slidably assembled by contacting the concave surface 112 of the concave member 108 in the first metal base portion 104 with the convex surface 114 of the convex member 110 in the second metal base portion 106. If the end face of the fuel cell stack 12 tilts, the concave surface 112 of the concave member 108 in the first metal base portion 104 and the convex surface 114 of the convex member 110 in the second metal base portion 106 slide, and the pressure surface following mechanism 102 follows the inclination of the end face in the fuel cell stack 12, thereby ensuring that pressure is more uniformly applied on the inclined end face.

Preferably, the concave surface 112 of the concave member 108 in the first metal base portion 104 is a concave sphere, and the convex surface 114 of the convex member 110 in the second metal base portion 106 is a convex sphere. With such a configuration, the pressure surface following mechanism 102 can follow the inclined end face generally about a center of the end face as a rotation center even if an inclination of the end face of the fuel cell stack 12 occurs. Of course, the concave surface 112 of the concave member 108 in the first metal base portion 104 is not limited to a concave sphere, and the convex surface 114 of the convex member 110 in the second metal base portion 106 is not limited to a convex sphere; the structures of each may be decided in consideration of other conditions. Moreover, the concave surface may be formed in one piece with the first metal base portion 104, and the convex surface may be formed in one piece with the second metal base portion 106. Depending on other conditions, the convex surface may be formed on the first metal base portion 104, and the concave surface may be formed on the second metal base portion 106.

Figure 10:
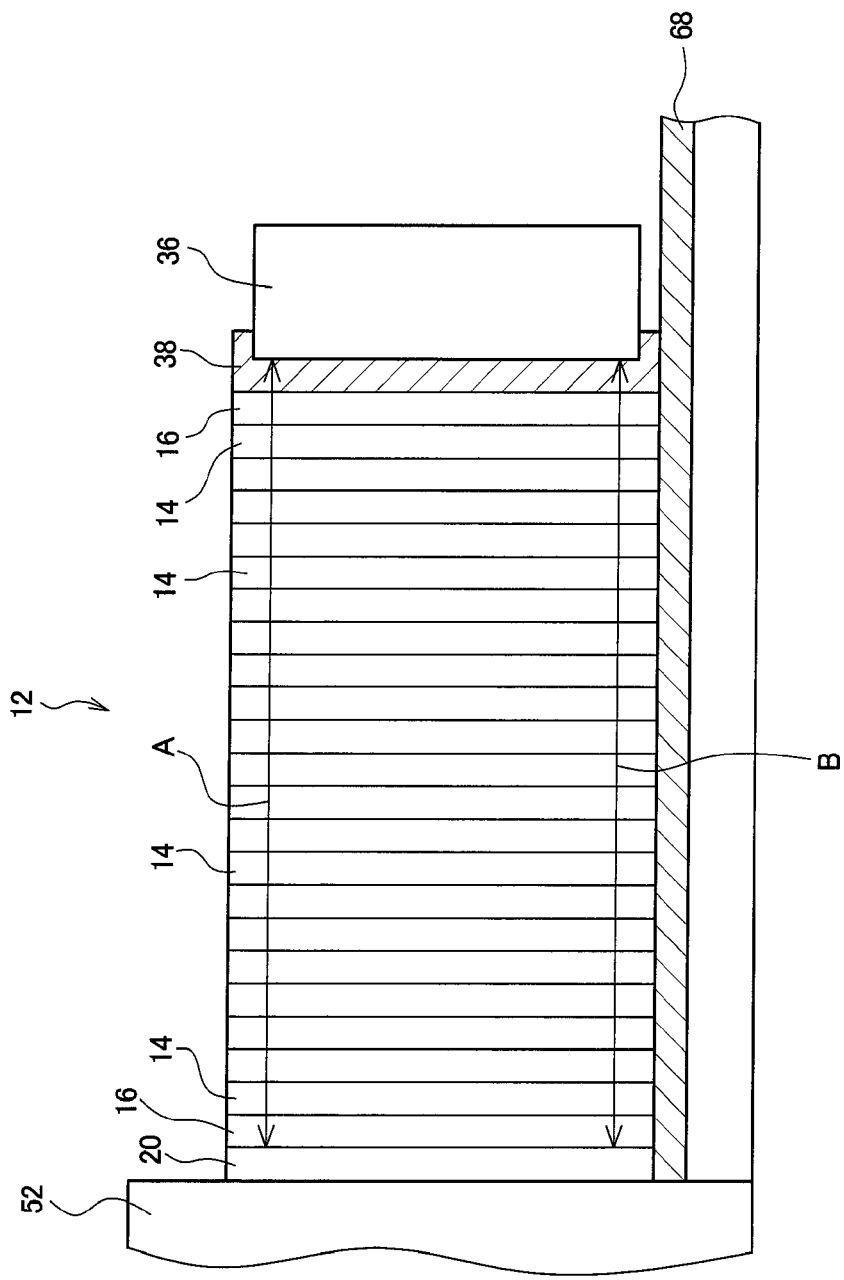
FIG. 10 is a side view showing a state in which the unit cell and the like are stacked in the fuel cell assembly and inspection device according to an embodiment of the present invention.

An operation of the pressure surface following mechanism 102 will now be described. FIG. 10 is a side view showing a state in which the unit cell 14 and the like are stacked in the fuel cell assembly and inspection device 100. The unit cell 14 and the like are stacked along the guide member 68. A length A of one end of the fuel cell stack 12 with the unit cell 14 and the like stacked and a length B of the other end thereof may be different. In such a case, the end face of the fuel cell stack 12 becomes tilted or inclined.

Figure 11:
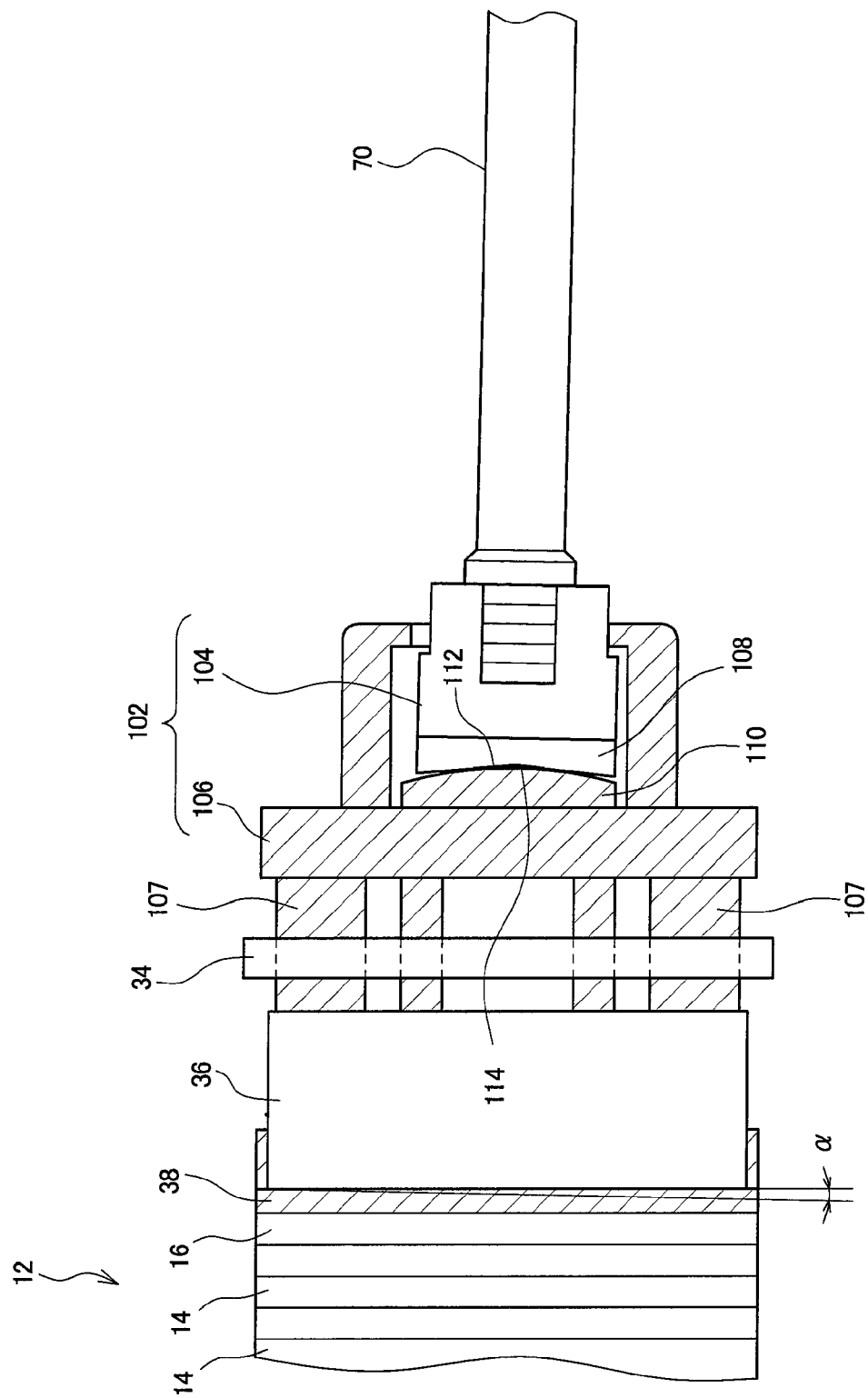
FIG. 11 is a side view showing an operation of a pressure surface following mechanism according to an embodiment of the present invention, when a length A of one end of the fuel cell stack is shorter than a length B of the other end thereof (length A<length B)

FIG. 11 is a side view showing an operation of the pressure surface following mechanism 102 when a length A of one end of the fuel cell stack 12 is shorter than a length B of the other end thereof (length A<length B). When the length A of the one end is shorter than the length B of the other end, in the pressure surface following mechanism 102, the concave surface 112 of the concave member 108 in the first metal base portion 104 and the convex surface 114 of the convex member 110 in the second metal base portion 106 slide so that pressure is applied to the fuel cell stack 12 when the second metal base portion 106 inclined at a predetermined angle α to the side of the end with the length B. Accordingly, pressure can be more even applied to the fuel cell stack 12, even when the length A of the one end is shorter than the length B of the other end.

Figure 12:
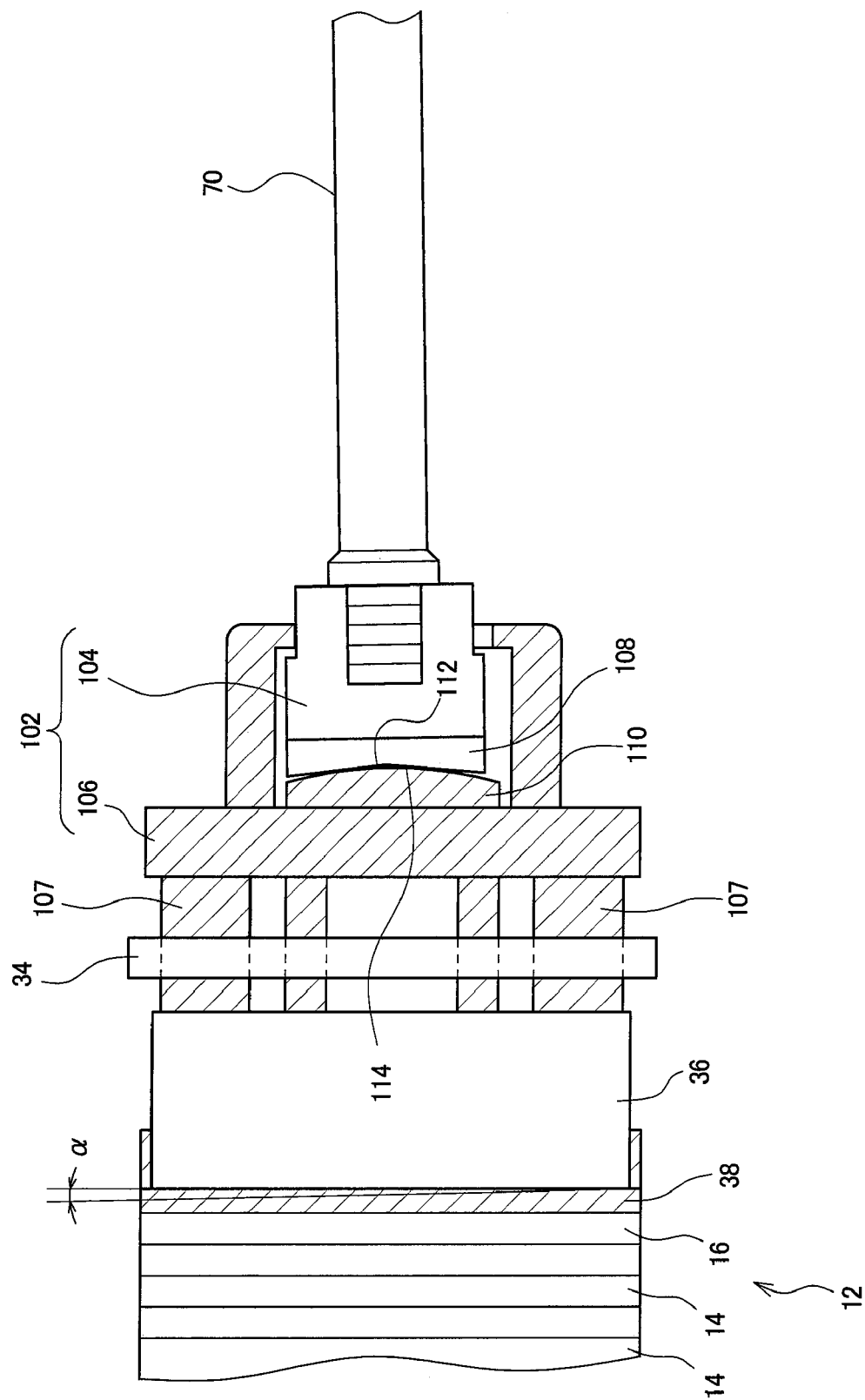
FIG. 12 is a side view showing an operation of the pressure surface following mechanism according to an embodiment of the present invention, when a length A of the one end of the fuel cell stack is longer than a length B of the other end thereof (length A>length B).

FIG. 12 is a side view showing an operation of the pressure surface following mechanism 102 when a length A of one end of the fuel cell stack 12 is longer than a length B of the other end thereof (length A>length B). When the length A of the one end is longer than the length B of the other end, in the pressure surface following mechanism 102, the concave surface 112 of the concave member 108 in the first metal base portion 104 and the convex surface 114 of the convex member 110 in the second metal base portion 106 slide, so that pressure is applied to the fuel cell stack 12 when the second metal base portion 106 inclined at a predetermined angle α to the side of the one end with the length A. Accordingly, pressure can be evenly applied to the fuel cell stack 12, even if the length A of the one end is longer than the length B of the other end.

After pressure is applied to the fuel cell stack 12, the pressure surface following mechanism 102 is positioned such that the load adjusting screw provided on the second end plate 34 is positioned according to the inclination of the end face of the fuel cell stack 12, and the pressure applied by the pressure cylinder 70 is then released.

When the above-described fuel cell assembly and inspection device comprising pressure surface following mechanism is adopted, a uniform pressure can be applied to the end face of a fuel cell, even when the end face of the fuel cell stack is tilted or inclined.

The invention claimed is:
1. Fuel cell assembly and inspection device, comprising:
a base plate for mounting
a fuel cell stack including
a first end plate, a current collecting plate placed on the first end plate, and a plurality of unit cells stacked on the current collecting plate; and a pressing device to press the fuel cell stack, wherein the fuel cell assembly and inspection device assembles a fuel cell by fixing a second end plate to a pressed fuel cell stack and comprises a fuel gas supply passage to supply a fuel gas for inspection to the fuel cell stack, a fuel gas discharge passage to discharge a fuel gas for inspection from the fuel cell stack, an oxidizing agent gas supply passage to supply an oxidizing agent gas for inspection to the fuel cell stack, an oxidizing agent gas discharge passage to discharge an oxidizing agent gas for inspection from the fuel cell stack, a cooling medium supply passage to supply a cooling medium for inspection to the fuel cell stack, and a cooling medium discharge passage to discharge a cooling medium for inspection from the fuel cell stack, and wherein the fuel gas supply passage, the fuel gas discharge passage, the oxidizing agent gas supply passage, the oxidizing agent gas discharge passage, the cooling medium supply passage, and the cooling medium discharge passage are connected through an opening provided in the base plate, respectively, with a fuel gas supply port, a fuel gas discharge port, an oxidizing agent gas supply port, an oxidizing agent gas discharge port, a cooling medium supply port, and a cooling medium discharge port, which are provided on the first end plate.

2. The fuel cell assembly and inspection device according to claim 1, wherein the equipment further comprises a guide member to guide a plurality of stacked unit cells in a stacking direction and formed of an insulating material.

3. The fuel cell assembly and inspection device according to claim 1, wherein the equipment comprises a guide member to guide a plurality of stacked unit cells in a stacking direction, and a floating mechanism to maintain non-contact between the plurality of stacked unit cells and the guide member during a power generation inspection.

4. The fuel cell assembly and inspection device according to claim 1, wherein the second end plate is fixed to the fuel cell stack with a tension plate.

5. The fuel cell assembly and inspection device according to claim 1, wherein assembly and inspection of the plurality of fuel cell stacks are performed simultaneously.

* * * * *

UNITED STATES PATENT AND TRADEMARK OFFICE
CERTIFICATE OF CORRECTION

| | | |
|---|---|---|
| PATENT NO. | : 8,076,044 B2 | Page 1 of 1 |
| APPLICATION NO. | : 12/373343 | |
| DATED | : December 13, 2011 | |
| INVENTOR(S) | : Kazuhiro Watanabe | |

It is certified that error appears in the above-identified patent and that said Letters Patent is hereby corrected as shown below:

| Column | Line | |
|---|---|---|
| 1 | 3 | After the title, insert: |
| | | -- This is a 371 national phase application of PCT/JP2007/065886 filed 08 August 2007, claiming priority to Japanese Patent Applications No. JP 2006-230252 filed 28 August 2006, and No. JP 2007-198357 filed 31 July 2007, respectively, the contents of which are incorporated herein by reference. --. |
| 14 | 8 | Change "equipment" to -- device --. |
| 14 | 13 | Change "equipment" to -- device --. |

Signed and Sealed this
Eighteenth Day of December, 2012

David J. Kappos
*Director of the United States Patent and Trademark Office*